US011990782B2

(12) United States Patent
Ning et al.

(10) Patent No.: US 11,990,782 B2
(45) Date of Patent: May 21, 2024

(54) AUTOMATICALLY UPDATING A FULL CHARGE CAPACITY OF A BATTERY OF AN INFORMATION HANDLING SYSTEM

(71) Applicant: Dell Products L.P., Round Rock, TX (US)

(72) Inventors: Yan Ning, Cedar Park, TX (US); Nikhil Manohar Vichare, Austin, TX (US); Richard Christopher Thompson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 436 days.

(21) Appl. No.: 17/444,772

(22) Filed: Aug. 10, 2021

(65) Prior Publication Data
US 2023/0051221 A1 Feb. 16, 2023

(51) Int. Cl.
*H02J 7/00* (2006.01)
*G06F 1/26* (2006.01)

(52) U.S. Cl.
CPC .............. *H02J 7/0048* (2020.01); *G06F 1/26* (2013.01); *H02J 7/00712* (2020.01)

(58) Field of Classification Search
CPC ........ H02J 7/0048; H02J 7/00712; G06F 1/26
See application file for complete search history.

(56) References Cited

U.S. PATENT DOCUMENTS

2012/0306450 A1* 12/2012 Nakayama ........... G01R 31/382
320/134
2014/0077815 A1* 3/2014 Mattisson .......... G01R 19/0069
324/426

* cited by examiner

*Primary Examiner* — Robert Grant
(74) *Attorney, Agent, or Firm* — McDermott Will & Emery LLP (57) ABSTRACT

Automatically updating a full charge capacity (FCC) of a battery of an information handling system, the method including: determining that the SOC of the battery is less than the SOC threshold; determining that the time since the previous update of the FCC of the battery is greater than the time threshold; identifying configuration parameters for an update of the FCC of the battery; comparing the configuration parameters with current conditions of the battery; based on comparing the configuration parameters with current conditions of the battery, determining that the current conditions of the battery are within bounds of the configuration parameters; and in response to determining that the current conditions of the battery are within the bounds of the configuration parameters, updating the FCC of the battery.

15 Claims, 3 Drawing Sheets

AUTOMATICALLY UPDATING A FULL CHARGE CAPACITY OF A BATTERY OF AN INFORMATION HANDLING SYSTEM

BACKGROUND

Field of the Disclosure

The disclosure relates generally to an information handling system, and in particular, automatically updating a full charge capacity of a battery of an information handling.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Only a portion of users update a full charge capacity (FCC) of a battery of an information handling system in a timely manner. The longer interval between updates of the FCC of the battery can result in a bad user experience of inaccurate runtime predictions, sudden system shutdowns, and data loss.

SUMMARY

Innovative aspects of the subject matter described in this specification may be embodied in a method of automatically updating a full charge capacity (FCC) of a battery of an information handling system, the method including identifying a state of charge (SOC) of the battery; comparing the SOC of the battery with a SOC threshold, and in response, determining that the SOC of the battery is less than the SOC threshold; in response to determining that the SOC of the battery is less than the SOC threshold, comparing a time since a previous update of the FCC of the battery to a time threshold, and in response, determining that the time since the previous update of the FCC of the battery is greater than the time threshold; in response to determining that the time since the previous update of the FCC of the battery is greater than the time threshold, identifying configuration parameters for an update of the FCC of the battery; comparing the configuration parameters with current conditions of the battery; based on comparing the configuration parameters with current conditions of the battery, determining that the current conditions of the battery are within bounds of the configuration parameters; and in response to determining that the current conditions of the battery are within the bounds of the configuration parameters, updating the FCC of the battery.

Other embodiments of these aspects include corresponding systems, apparatus, and computer programs, configured to perform the actions of the methods, encoded on computer storage devices.

These and other embodiments may each optionally include one or more of the following features. For instance, updating the FCC of the battery further comprises performing discharge on the battery. Performing the discharge includes discharging the battery and subsequently charging the battery based on the configuration parameters. After performing the discharge on the battery, updating the time since an update of the FCC of the battery. Prior to performing the discharge on the battery: providing a notification to a user of the information handling system indicating a request to perform the discharge on the battery; in response to the notification, receiving a user response indicating permission to perform the discharge on the battery; and performing, at the battery, the discharge. Determining that the SOC of the battery is greater than the SOC threshold, and in response, aborting the update of the FCC of the battery. Determining that the time since the previous update of the FCC of the battery is less than the time threshold, and in response, aborting the update of the FCC of the battery. Determining that at least one of the current conditions of the battery are outside of the bounds of the respective configuration parameter, and in response, aborting the update of the FCC of the battery.

Particular implementations of the subject matter described in this specification can be implemented so as to realize one or more of the following advantages. For example, waste of useful battery cycles is minimized while maximizing system availability during the battery update cycle.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for updating a full charge capacity (FCC) of a battery of an information handling system. In short, opportunity windows can be identified for updates of the FCC of the battery based on current and expected system behavior of the information handling system and the battery. For example, based on such current and expected system behavior, it can be determined when to minimize (suppress) charge of the battery when an AC adapter is present and to allow the update of the FCC of the battery.

Specifically, this disclosure discusses a system and a method for automatically updating a full charge capacity (FCC) of a battery of an information handling system, the method including: identifying a state of charge (SOC) of the battery; comparing the SOC of the battery with a SOC threshold, and in response, determining that the SOC of the battery is less than the SOC threshold; in response to determining that the SOC of the battery is less than the SOC threshold, comparing a time since a previous update of the FCC of the battery to a time threshold, and in response, determining that the time since the previous update of the FCC of the battery is greater than the time threshold; in response to determining that the time since the previous update of the FCC of the battery is greater than the time threshold, identifying configuration parameters for an update of the FCC of the battery; comparing the configuration parameters with current conditions of the battery; based on comparing the configuration parameters with current conditions of the battery, determining that the current conditions of the battery are within bounds of the configuration parameters; and in response to determining that the current conditions of the battery are within the bounds of the configuration parameters, updating the FCC of the battery.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
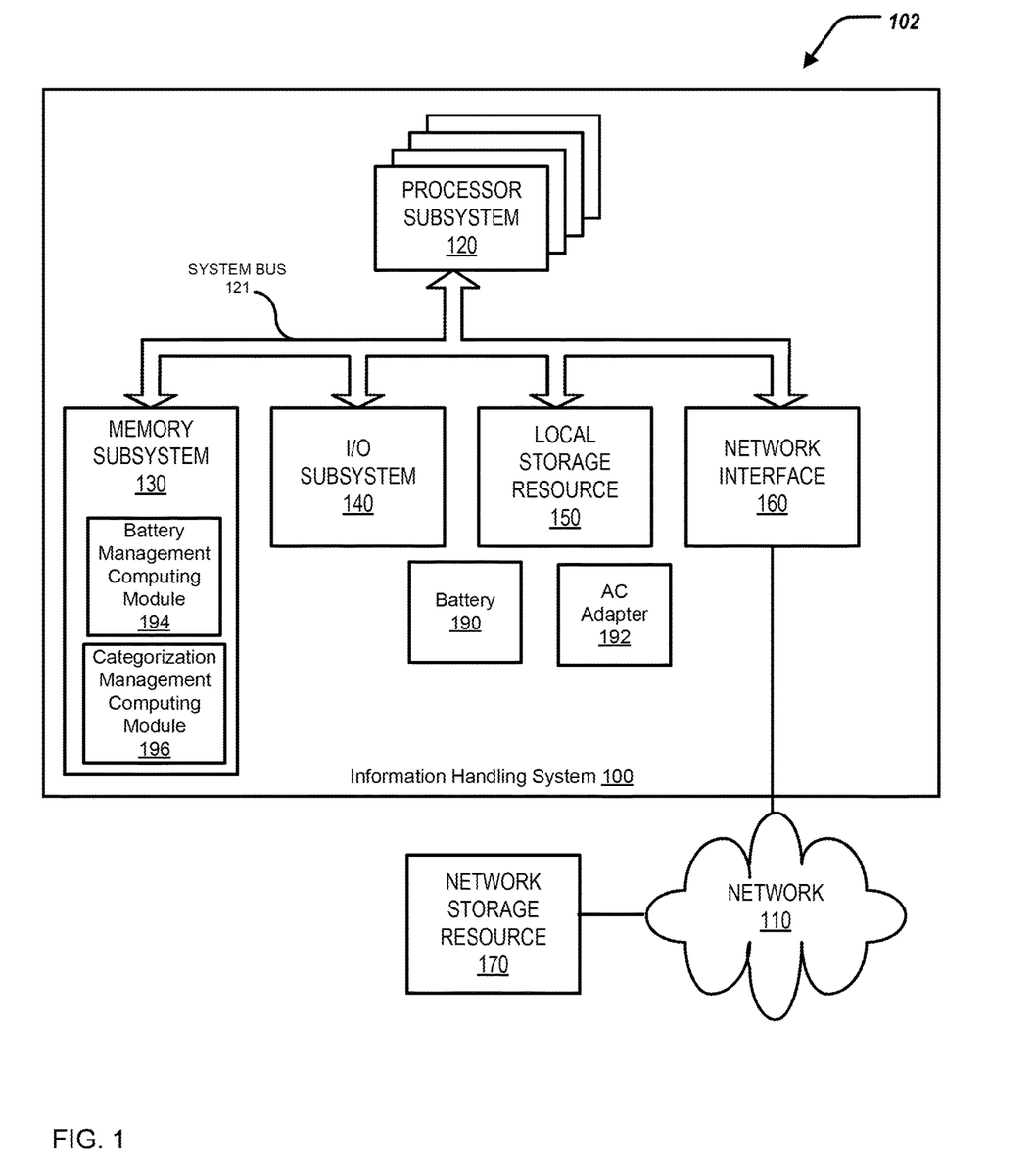
FIG. 1 is a block diagram of selected elements of an embodiment of an information handling system.
Figure 2:
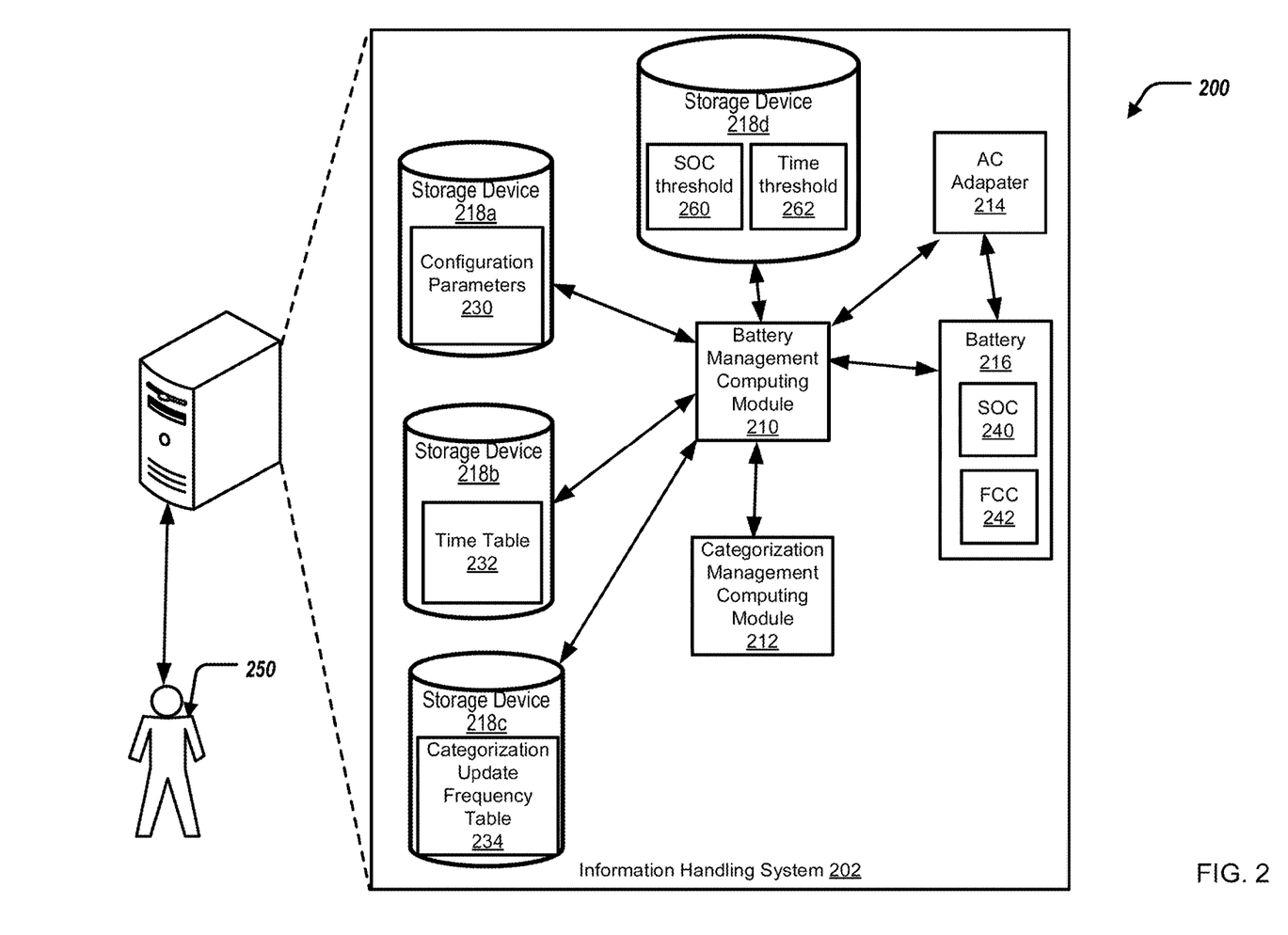
FIG. 2 illustrates a block diagram of an information handling system for updating a full charge capacity of a battery of the information handling system.
Figure 3:
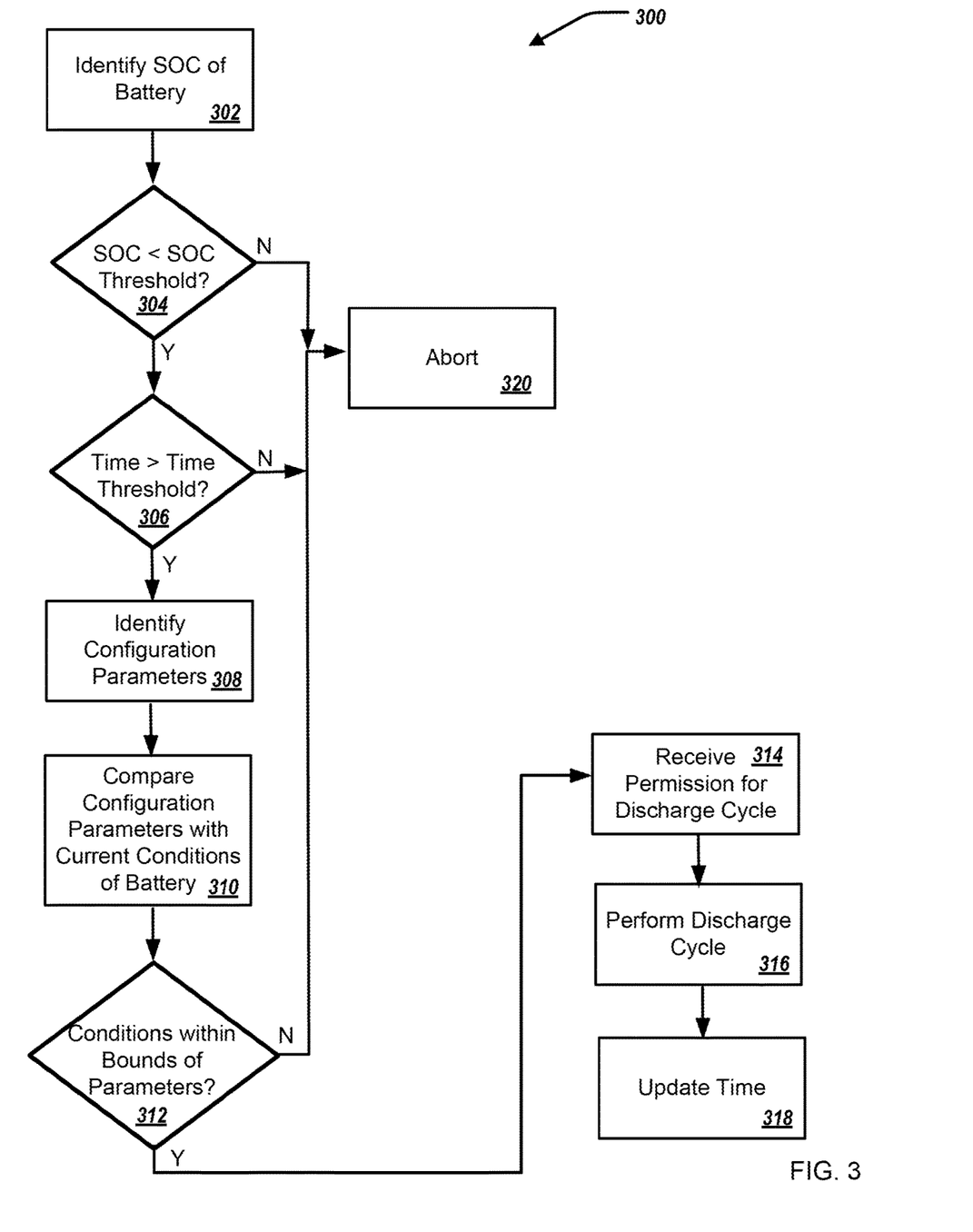
FIG. 3 illustrates a method for updating a full charge capacity of a battery of the information handling system.

Particular embodiments are best understood by reference to FIGS. 1-3 wherein like numbers are used to indicate like and corresponding parts.

Turning now to the drawings, FIG. 1 illustrates a block diagram depicting selected elements of a computing environment 102 including an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

The information handling system 100 can further have a battery 190 and an AC adapter 192 that provide power to the information handling system 100.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a battery management computing module 194. The battery management computing module 194 can be included by the memory subsystem 130. The battery management computing module 194 can include a computer-executable program (software). The battery management computing module 194 can be executed by the processor subsystem 120.

The information handling system 100 can also include a categorization management computing module 196. The categorization management computing module 196 can be included by the memory subsystem 130. The categorization management computing module 196 can include a computer-executable program (software). The categorization management computing module 196 can be executed by the processor subsystem 120.

Turning to FIG. 2, FIG. 2 illustrates an environment 200 including an information handling system 202. The information handling system 202 can include a battery management computing module 210, a categorization management computing module 212, an AC adapter 214, a battery 216, and storage devices 218a, 218b, 218c, 218d. In some examples, the information handling system 202 is similar to, or includes, the information handling system 100 of FIG. 1. In some examples, the battery management computing module 210 is the same, or substantially the same, as the battery management computing module 194 of FIG. 1. In some examples, the categorization management computing module 212 is the same, or substantially the same, as the categorization management computing module 196 of FIG. 1.

In some examples, the battery 216 is the same, or substantially the same, as the battery 190 of FIG. 1. In some examples, the AC adapter 214 is the same, or substantially the same, as the AC adapter 192 of FIG. 1. The AC adapter 214 can charge, or provide energy to, the battery 216. The battery 216 can be associated with a state of charge (SOC) 240, and a full charge capacity (FCC) 242.

The battery management computing module 210 can be in communication with the persona management computing module 212, the AC adapter 214, the battery 216, and the storage devices 218a, 218b, 218c, 218d.

The storage device 218a can store configuration parameters 230. The configuration parameters 230 can indicate variables that are tracked and associated with the battery 216. For example, the configuration parameter 230 can include usage statistics of the battery 216, how often the battery 216 is deep discharged, the power of the battery 216, the state of charge (SOC) of the battery 216, session information of the battery 216 (beginning and ending levels of the SOC). For example, the configuration parameters 230 can include battery version and serial numbers, part numbers of the battery 216, maximum discharge load of the battery 216, maximum self-discharge of the battery 216, maximum valid charge of the battery 216, temperature maximum of the battery 216, and temperature minimum of the battery 216, among other parameters.

The storage device 218b can store a time table 232. The time table 232 can indicate historically updates of the full charge capacity (FCC) of the battery 216. For example, the time table 232 can indicate timestamps of previous updates of the FCC of the battery 216.

The storage device 218c can store a categorization update frequency table 234. The categorization update frequency table 234 can indicate, for a particular categorization of use of the information handling system 202 (e.g., by a user 250 of the information handling system 202), a frequency of update of the FCC 242 of the battery 216.

The storage device 218d can store data indicating a SOC threshold 260 and a time threshold 262. The SOC threshold 260 relates to the SOC 240 of the battery 216, and the time threshold 262 relates to a time since last update of the FCC 242 of the battery 216.

In short, the battery management computing module 210 can identify opportunity windows for update of the FCC 242 of the battery 216 based on current and expected system behavior of the information handling system 202 and the battery 216. For example, based on such current and expected system behavior, the battery management computing module 210 can determine when to minimize (suppress) charge of the battery 216 when the AC adapter 214 is present and to allow the update of the FCC 242 of the battery 216.

FIG. 3 illustrates a flowchart depicting selected elements of an embodiment of a method 300 for automatically updating the FCC 242 of the battery 216 of the information handling system 202. The method 300 may be performed by the information handling system 100, the information handling system 202, the battery management computing module 210, and/or the categorization management computing module 212, and with reference to FIGS. 1-2. It is noted that certain operations described in method 300 may be optional or may be rearranged in different embodiments.

The battery management computing module 210 can identify the SOC 240 of the battery 216, at 302. For example, the battery management computing module 210 can be in communication with the battery 216 to identify the SOC 240 of the battery 216.

The battery management computing module 210 can compare the SOC 240 of the battery 216 with the SOC threshold 260, at 304. In some examples, the battery management computing module 210 can, in response to comparing the SOC 240 of the battery 216 with the SOC threshold 260, determine that the SOC 240 of the battery 216 is less than the SOC threshold 260. For example, the SOC threshold 260 can be 30%, and the SOC 240 of the battery 216 is 20%.

The battery management computing module 210, in response to determining that the SOC 240 of the battery 216 is less than the SOC threshold 260, can compare a time since a previous update of the FCC 242 of the battery 216 to the time threshold 262, at 306. For example, the battery management computing module 210 can access the time table 212 to identify a time of a previous, or last, update of the FCC 242 of the battery 216. In some examples, the battery management computing module 210 can, in response to comparing the time since a previous update of the FCC 242 of the battery to the time threshold 262, determine that the time since the previous update of the FCC 242 of the battery 216 is greater than the time threshold 262. For example, the time threshold 262 can be 90 days, and the time since the previous update is 92 days.

The battery management computing module 210, in response to determining that the time since the previous update of the FCC 242 of the battery 216 is greater than the time threshold 262, identifies the configuration parameters 230 for an update of the FCC 242 of the battery 216, at 308. Specifically, the battery management computing module 210 access the configuration parameters 230 that are stored at the storage device 218a. The configuration parameters 230 can be unique and/or created for the battery 216 and/or the information handling system 202. In some examples, the configuration parameters 230 can be stored locally, provisioned by a battery management unit (BMU) of the information handling system 202 via an embedded controller (EC), or obtained through a third-party storage device accessible over the Internet (e.g., cloud). The configuration parameters 230 can indicate a list of conditions for update of the FCC 242 of the battery 216.

The battery management computing module 210 can compare the configuration parameters 230 with current conditions of the battery 216, at 310. That is, the battery management computing module 210 can identify current conditions of the battery 216, such as temperature of the battery 216, discharge rate of the battery 216, etc., and compare such with the configuration parameters 230.

The battery management computing module 210, based on comparing the configuration parameters 230 with the current conditions of the battery 216, can determine, in some examples, that the current conditions of the battery 216 are within bounds of the configuration parameters 230, at 312. For example, the battery management computing module 210 can determine that the temperature of the battery 216 and/or the discharge rate of the battery 216 are within the bounds (or thresholds, or limitations) of the configuration parameters 230. For example, the battery management computing module 210 can determine that the temperature of the battery 216 and/or the discharge rate of the battery 216 are within the bounds of the maximum discharge load of the battery 216, maximum self-discharge of the battery 216, maximum valid charge of the battery 216, temperature maximum of the battery 216, and temperature minimum of the battery 216, among other parameters.

The battery management computing module 210, in response to determining that the current conditions of the battery 216 are within the bounds of the configuration parameters 230, updates the FCC 242 of the battery 216. In some examples, updating the FCC 242 of the battery 216 can include performing discharge on the battery 216. That is, updating the FCC 242 of the battery 216 can include discharging the battery 216 (fully or to a predetermined level) (from the SOC 240 of the battery 216 that is less than the SOC threshold 260 and subsequently charging the battery 216 (fully or to a predetermined level) based on the configuration parameters 230.

Specifically, when the battery management computing module 210 determines that the current conditions of the battery 216 are within the bounds of the configuration parameters 230, the battery management computing module 210 can provide a notification to the user 250 of the information handling system 202 indicating a request for permission to perform discharge on the battery, at 314. For example, the notification can be provided via a graphical user interface element provided on a display of the information handling system 202. In response to the notification, the battery management computing module 210 can receive data indicating a user response indicating permission to perform the discharge on the battery 216. The battery management computing module 210 can perform the discharge on the battery 216, at 316.

The battery management computing module 210 can, after performing the discharge on the battery 216, calculate the FCC 242 of the battery 216 based on the current conditions of the battery 216. For example, the battery management computing module 210 can, after performing the discharge on the battery, calculate the FCC 242 of the battery 216 based on the age and other parameters of the battery 216 (as indicted by the parameters 230). Furthermore, the battery management computing module 210 can, after performing the discharge on the battery 216 update the time table 212 to indicate the time since an update of the FCC 242 of the battery 216 (for the corresponding FCC), at 318.

In some examples, the battery management computing module 210 can provide the notification to the user 250 and perform the discharge on the battery 216 based on timing events associated with the user 250. For example, the battery management computing module 210 can access a calendaring computer-executable program associated with the user 250 and/or the information handling system 202 to identify a schedule of the user 250. For example, the battery management computing module 210 can identify a current time and/or date. The battery management computing module 210 can perform the discharge on the battery 216 based on the calendaring information of the user 250 and/or the current time/date. For example, when the calendaring information indicates that the user 250 does not have any further appointments/meetings (for the day) and the current time/date indicates that it is the end of the workday, the battery management computing module 210 can continue with the discharge on the battery 216. For example, when the calendaring information indicates that the user 250 has a meeting at 2 pm and the current time is 1:30 pm, the battery management computing module 210 can abort the discharge on the battery 216.

In some examples, the battery management computing module 210 can, in response to comparing the SOC 240 of the battery 216 with the SOC threshold 260, determine that the SOC 240 of the battery 216 is greater than the SOC threshold 260. For example, the SOC threshold 260 can be 30%, and the SOC 240 of the battery 216 is 50%. The battery management computing module 210, in response to determining that the SOC 240 of the battery 216 is greater than the SOC threshold 260, can abort the update of the FCC 242 of the battery 216, at 320.

In some examples, the battery management computing module 210 can, in response to comparing the time since a previous update of the FCC 242 of the battery to the time threshold 262, determine that the time since the previous update of the FCC 242 of the battery 216 is less than the time threshold 262. For example, the time threshold 262 can be 90 days, and the time since the previous update is 63 days. The battery management computing module 210, in response to determining that the time since the previous update of the FCC 242 of the battery 216 is less than the time threshold 262, can abort the update of the FCC 242 of the battery 216, at 320.

The battery management computing module 210, based on comparing the configuration parameters 230 with the current conditions of the battery 216, can determine, in some examples, that at least one of the current conditions of the battery 216 are outside of the bounds of the respective configuration parameter 230. The battery management computing module 210, in response to that at least one of the current conditions of the battery 216 are outside of the bounds of the respective configuration parameter 230, can abort the update of the FCC 242 of the battery 216, at 320.

In some implementations, the battery management computing module 210 can further automate update of the FCC 242 of the battery 216 based on historical usage data of the battery 216, categorization of the user 250 and/or the information handling system 202, size (watt-hour) of the battery 216 to determine frequency of update of the FCC 242 of the battery 216. Specifically, the categorization management computing module 212 can identify a categorization of the user 250 and/or the information handling system 202 based on usage of the information handling system 202 (e.g., how the user 250 is using the information handling system 202, and in particular, the battery 216). For example, such categorization of the user 250 and/or the information handling system 202 can be based on how often the battery 216 is (fully or partially) charged, how often the battery 216 is (fully or partially) discharged, how often the battery 216 supplies power to the information handling system 202, how often the AC adapter 214 supplies power to the information handling system 202, and similar.

The categorization management computing module 212 can determine a number of times the user 250 and/or the information handling system 202 is categorized under a particular category (or persona). For example, the categorization of the user 250 and/or the information handling system 202 can change over time as usage of the information handling system 202 and/or the battery 316 changes. To that end, the categorization management computing module 212 can, for a time period, determine the number of times the user 250 and/or the information handling system 202 is categorized under a particular category. The categorization management computing module 212 can categorize the user 250 and/or the information handling system 202 under a particular category based on the category that the user 250 and/or the information handling system 202 is categorized under the most during the time period. The categorization management computing module 212 can provide such categorization of the user 250 and/or the information handling system 202 to the battery management computing module 210.

The battery management computing module 210 can access the categorization update frequency table 234 based on the category of the user 250 and/or the information handling system 202. The battery management computing module 210 can map the categorization of the user 250 and/or the information handling system 202 to a frequency of update (e.g., calendar days). For example, for a particular type of categorization of the user 250 and/or the information handling system 202, the battery management computing module 210 performs the update of the FCC 242 of the battery 216 every X days; and for another particular type of categorization of the user 250 and/or the information handling system 202, the battery management computing module 210 performs the update of the FCC 242 of the battery 216 every Y days. For example, for the user 250 and/or the information handling system 202 to be categorized as a "deep discharger" of the battery 216, the battery management computing module 210 can perform the update of the FCC 242 every 60 days. For example, for the user 250 and/or the information handling system 202 to be categorized as a "daily charger" of the battery 216, battery management computing module 210 can perform the update of the FCC 242 every 180 days.

Furthermore, the battery management computing module 210 can identify a size (watt-hour (Wh)) of the battery 216 and determine a frequency of update of the FCC 242 based on the size (watt-hour (Wh)) of the battery 216. That is, the frequency of the update of the FCC 242 of the battery 216 can be scaled to the size (watt-hour (Wh)) of the battery 216. In particular, as the size of the battery 216 increases, the frequency of the updates of the FCC 242 of the battery 216 are correspondingly increased. For example, when the size of the battery 216 is 100 Wh the battery 216 can have an increased frequency of updates of the FCC 242 as compared to when the size of the battery 216 is 50 Wh.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of automatically updating a full charge capacity (FCC) of a battery of an information handling system, the method comprising:
   identifying a state of charge (SOC) of the battery;
   comparing the SOC of the battery with a SOC threshold, and in response, determining that the SOC of the battery is less than the SOC threshold;
   in response to determining that the SOC of the battery is less than the SOC threshold, comparing a time since a previous update of the FCC of the battery to a time threshold, and in response, determining that the time since the previous update of the FCC of the battery is greater than the time threshold;
   in response to determining that the time since the previous update of the FCC of the battery is greater than the time threshold, identifying configuration parameters for an update of the FCC of the battery;
   comparing the configuration parameters with current conditions of the battery;
   based on comparing the configuration parameters with current conditions of the battery, determining that the current conditions of the battery are within bounds of the configuration parameters; and
   in response to determining that the current conditions of the battery are within the bounds of the configuration parameters;
   updating the FCC of the battery:,
   providing a notification to a user of the information handling system indicating a request to perform a discharge on the battery;
   in response to the notification, receiving a user response indicating permission to perform the discharge on the battery; and
   performing, at the battery, the discharge.

2. The computer-implemented method of claim 1, wherein performing the discharge includes discharging the battery and subsequently charging the battery based on the configuration parameters.

3. The computer-implemented method of claim 1, further comprising after performing the discharge on the battery, updating the time since an update of the FCC of the battery.

4. The computer-implemented method of claim 1, further comprising:
   determining that the SOC of the battery is greater than the SOC threshold, and in response, aborting the update of the FCC of the battery.

5. The computer-implemented method of claim 1, further comprising:
   determining that the time since the previous update of the FCC of the battery is less than the time threshold, and in response, aborting the update of the FCC of the battery.

6. The computer-implemented method of claim 1, further comprising:
   determining that at least one of the current conditions of the battery are outside of the bounds of the respective configuration parameter, and in response, aborting the update of the FCC of the battery.

7. An information handling system comprising a processor having access to memory media storing instructions executable by the processor to perform operations, comprising:
   identifying a state of charge (SOC) of a battery;
   comparing the SOC of the battery with a SOC threshold, and in response, determining that the SOC of the battery is less than the SOC threshold;
   in response to determining that the SOC of the battery is less than the SOC threshold, comparing a time since a previous update of a full-charge capacity of the battery to a time threshold, and in response, determining that the time since the previous update of the FCC of the battery is greater than the time threshold;
   in response to determining that the time since the previous update of the FCC of the battery is greater than the time threshold, identifying configuration parameters for an update of the FCC of the battery;
   comparing the configuration parameters with current conditions of the battery;
   based on comparing the configuration parameters with current conditions of the battery, determining that the current conditions of the battery are within bounds of the configuration parameters; and
   in response to determining that the current conditions of the battery are within the bounds of the configuration parameters;
   updating the FCC of the battery;
   providing a notification to a user of the information handling system indicating a request to perform a discharge on the battery;

in response to the notification, receiving a user response indicating permission to perform the discharge on the battery; and performing, at the battery, the discharge.

8. The information handling system of claim 7, wherein performing the discharge includes discharging the battery and subsequently charging the battery based on the configuration parameters.

9. The information handling system of claim 7, the operations further comprising after performing the discharge on the battery, updating the time since an update of the FCC of the battery.

10. The information handling system of claim 7, the operations further comprising:

determining that the SOC of the battery is greater than the SOC threshold, and in response, aborting the update of the FCC of the battery.

11. The information handling system of claim 7, the operations further comprising:

determining that the time since the previous update of the FCC of the battery is less than the time threshold, and in response, aborting the update of the FCC of the battery.

12. The information handling system of claim 7, the operations further comprising:

determining that at least one of the current conditions of the battery are outside of the bounds of the respective configuration parameter, and in response, aborting the update of the FCC of the battery.

13. A non-transitory computer-readable medium storing software comprising instructions executable by one or more computers which, upon such execution, cause the one or more computers to perform operations comprising:

identifying a state of charge (SOC) of a battery;

comparing the SOC of the battery with a SOC threshold, and in response, determining that the SOC of the battery is less than the SOC threshold;

in response to determining that the SOC of the battery is less than the SOC threshold, comparing a time since a previous update of a full-charge capacity of the battery to a time threshold, and in response, determining that the time since the previous update of the FCC of the battery is greater than the time threshold;

in response to determining that the time since the previous update of the FCC of the battery is greater than the time threshold, identifying configuration parameters for an update of the FCC of the battery;

comparing the configuration parameters with current conditions of the battery;

based on comparing the configuration parameters with current conditions of the battery, determining that the current conditions of the battery are within bounds of the configuration parameters; and in response to determining that the current conditions of the battery are within the bounds of the configuration parameters;

updating the FCC of the battery:, providing a notification to a user of the information handling system indicating a request to perform a discharge on the battery;

in response to the notification, receiving a user response indicating permission to perform the discharge on the battery; and performing, at the battery, the discharge.

14. The non-transitory computer-readable medium of claim 13, wherein performing the discharge includes discharging the battery and subsequently charging the battery based on the configuration parameters.

15. The non-transitory computer-readable medium of claim 13, the operations further comprising after performing the discharge on the battery, updating the time since an update of the FCC of the battery.

\* \* \* \* \*